United States Patent
Macaluso

(10) Patent No.: US 7,238,381 B2
(45) Date of Patent: Jul. 3, 2007

(54) SYSTEM FOR MICROORGANISM CONTROL

(76) Inventor: Virgil Macaluso, 3101 Terra Vista Dr., Independence, KS (US) 67301

( * ) Notice: Subject to any disclaimer, the term of this patent is extended or adjusted under 35 U.S.C. 154(b) by 0 days.

(21) Appl. No.: 11/366,667

(22) Filed: Mar. 2, 2006

(65) Prior Publication Data

US 2006/0246204 A1    Nov. 2, 2006

Related U.S. Application Data

(63) Continuation-in-part of application No. 11/116,710, filed on Apr. 28, 2005.

(51) Int. Cl.
*A23L 1/36* (2006.01)
*A23B 9/04* (2006.01)

(52) U.S. Cl. .................. 426/632; 426/455; 426/456; 426/460; 426/465

(58) Field of Classification Search .............. 426/632, 426/465, 455, 456, 460
See application file for complete search history.

(56) References Cited

U.S. PATENT DOCUMENTS

| | | | |
|---|---|---|---|
| 2,256,700 A * | 9/1941 | Armstrong | ............ 426/442 |
| 5,189,809 A | 3/1993 | Bailey et al. | |
| 5,811,143 A | 9/1998 | Ingemanson | |
| 5,893,217 A | 4/1999 | Johanson et al. | |
| 6,003,244 A | 12/1999 | Johanson et al. | |
| 6,010,727 A | 1/2000 | Rosenthal | |
| 6,105,273 A * | 8/2000 | Johanson et al. | ............ 34/267 |
| 6,927,192 B2 * | 8/2005 | Martinelli et al. | .......... 504/100 |
| 2003/0150128 A1 | 8/2003 | Macaluso et al. | |
| 2004/0081577 A1 | 4/2004 | Macaluso et al. | |

OTHER PUBLICATIONS

Kim, Hyun et al. 2006 "Effects of Ultrasound, Irradiation, and Acidic Electolyzed Water", J. of Food Science, vol. 71, Nr.6, 2006, pp. 168-173.*

* cited by examiner

*Primary Examiner*—Helen Pratt
(74) *Attorney, Agent, or Firm*—Hovey Williams LLP

(57) ABSTRACT

A method of infrared heat-processing of nuts (e.g., almonds, Brazil nuts, cashews, hazelnuts, macadamias, pecans, pine nuts, pistachios, walnuts and mixtures thereof) in order to reduce the microorganism level thereof is provided wherein the nuts are sequentially moisturized by application of water and then subjected to infrared radiation, preferably through a series of treatment cycles. Nut treatment apparatus (10) includes opposed banks of infrared heaters (38,40), with plural water application stations (48,50,52) along the length of the heater banks (38,40).

15 Claims, 2 Drawing Sheets

US 7,238,381 B2

SYSTEM FOR MICROORGANISM CONTROL

RELATED APPLICATION

The present application is a continuation-in-part of application Ser. No. 11/116,710, filed Apr. 28, 2005, which is incorporated by reference herein.

BACKGROUND OF THE INVENTION

1. Field of the Invention

The present invention is broadly concerned with improved method and apparatus for treatment of nuts to control and reduce the level of potentially harmful microorganisms thereon. More particularly, the invention is concerned with such methods and apparatus wherein nuts are treated by application of water to the surface thereof followed by subjecting the nuts to infrared radiation sufficient to effect microorganism reduction; in preferred forms, the nuts are subjected to plural cycles of moisturization/infrared radiation.

2. Description of the Prior Art

U.S. Pat. No. 6,003,244 (incorporated by reference herein) describes improved tunnel-type infrared drying apparatus wherein a belt carrying a product to be dried is passed through an elongated drying tunnel equipt with a series of infrared heaters. If desired, the belt has associated agitators along the length thereof for agitating the product to ensure even infrared drying.

It is known that nut varieties such as almonds can carry significant quantities of harmful microorganisms such as *Salmonella enteritidis*. A large proportion of almonds are roasted prior to consumption thereof, and this technique is generally deemed adequate for control of *S. enteritidis* and other harmful bacteria. However, significant amounts of almonds are not subjected to roasting and are used as food additives and the like. In the case of these unroasted nuts, the microorganism problem remains largely unresolved and there has been no truly efficient, cost-effective way of almond treatment.

SUMMARY OF THE INVENTION

The present invention overcomes the problems outlined above and provides a method of treating particulate material, particularly comestible materials, and specifically nuts, to reduce the level of microorganisms carried thereby, comprising the steps of first wetting the surface of the particulate material and thereafter subjected them to infrared radiation sufficient to reduce the microorganism level. While nuts are the preferred materials to be treated, the present invention, however, may be used to treat any kind of particulate material in order to reduce the level of microorganisms present thereon. That nuts are particularly preferred objects to be treated should not be seen as limiting the scope of the present invention in any manner. The following description generally refers to the treatment of nuts. It is understood that any kind of particulate material or particulate comestible material may be substituted for the term "nuts" in this description.

In preferred forms, the nuts are subjected to successive treatment cycles each involving application of water to the nuts with subsequent infrared heating. Preferably, the water that is applied to the nuts is electrolyzed-oxidizing (EO) water. EO water is created by electrochemical disassociation of salt water into an acidic water stream and an alkaline water stream. Most commonly, the salt water is prepared by admixing sodium chloride into water (softened tap water is preferred). EO water may be produced using an EO water generator, such as an ROX20TA-U water electrolyzer available from Hoshizaki America, Inc., Peachtree City, Ga. In an EO water generator, a voltage is applied across an anode and cathode. Positive ions in the water ($Na^+$ and $H^+$) are attracted to the cathode and negative ions ($Cl^-$ and $OH^-$) are attracted to the anode. A stream is drawn off proximate the cathode area, producing alkaline or reducing water. Another stream is drawn off proximate the anode area, producing acidic or oxidizing water. The alkaline stream generally comprises an aqueous sodium hypochlorite solution having a pH of greater than about 8, more preferably between about 9-12, and most preferably between about 10-11.5. The acidic stream generally comprises hypochlorous acid and residual free chlorine. The amount of free chlorine in this stream is preferably at least about 1 ppm, more preferably between about 5-75 ppm, and most preferably about 50 ppm. The acidic stream presents a pH of less than about 5, more preferably between about 1-4, and most preferably between about 2-3. Preferably, the nuts are treated with the EO water acidic stream.

EO water generally presents a relatively high oxidation-reduction potential (ORP) when compared to other kinds of water (i.e., distilled water, tap water, deionized water, etc.). ORP is a measurement of the electric potential in the EO water. ORP is generally an indication of the ability of the oxidizers in the water to neutralize contaminants. Preferably, water from the alkaline stream presents an ORP of between about −400 to about −1200 mV, more preferably between about −600 to about −1100 mV, even more preferably between about −700 to about −1000 mV, and most preferably about −800 mV. The water from the acidic stream presents an ORP of at least about +650 mV, more preferably between about +700 to about +1500 mV, even more preferably between about +800 to about +1200 mV, and most preferably about +1100 mV.

Advantageously, the method is carried out in an apparatus that comprises at least one elongated tunnel-type heater equipped with upper and lower banks of infrared heaters and at least one water application station axially spaced apart along the length of the apparatus. Preferably, the apparatus comprises a plurality of heaters and intermittent, axially spaced apart water application stations along the length of the apparatus.

In preferred processing, the nuts (e.g., almonds, peanuts, Brazil nuts, cashews, hazelnuts, macadamias, pecans, pine nuts, pistachios, walnuts and mixtures thereof) are wetted by spraying, fogging or misting of water. This water application step is contrasted with the direct application of steam. In the present invention, the water is preferably applied in the liquid state such as fine droplets formed by fogging, misting or spraying. In a particularly preferred embodiment, EO water is applied to the nuts which are allowed to soak for a predetermined period of time before being subjected to infrared radiation, which then heats the wetted nuts to a maximum temperature of at least 140° F. and more preferably to at least about 170° F. Preferably, the step of subjecting the nuts to infrared radiation begins no earlier than at least 2 minutes after the beginning of the water application step. More preferably, this period of time is between about 2.5-5 minutes, and most preferably between about 3-4.5 minutes. During the period of time from the beginning of the water application step to the start of the infrared radiation application step water may be continuously applied to the nuts, be applied initially to the nuts and then application of water discontinued for the remainder of the period prior to IR treatment, or be applied intermittently over this time period. It has been discovered that this "soaking period" may increase the effectiveness of the treatment method and lead to the greatest reduction in microorganism levels.

In any case, the processing should reduce the level of at least one microorganism carried by the nuts by a 4 log factor (at least about 99.99%,) and more preferably by a 5 log factor (at least about 99.999%) as compared with the microorganism count of the nuts prior to processing. Also, in preferred practice the nuts should be treated so as to achieve a nut water activity of from about 0.5-0.62.

In preferred embodiments, the present invention accomplishes a reduction in the level of microorganisms without the use of chemicals (other than those derived from sodium chloride which are produced during EO water generation) such as antimicrobial agents thereby eliminating the possibility that the nuts could become contaminated. The present invention also effects the reduction in microorganism level without the use of ionizing radiation such as X-rays and gamma rays thereby eliminating a radiation exposure concern expressed by a segment of the public. The present invention also accomplishes this stated goal without direct exposure of the nuts to steam. Although relatively benign, the exposure of the nuts to steam can damage the skin of the nut, whereas with the present invention such damage is avoided. Furthermore, the method according to the present invention does not cause the nuts to retain a significant amount of moisture.

Preferred processing operations also provide significant economic advantages over other forms of processing. Infrared radiation may be supplied though flameless, gas-fired catalytic heaters such as those described below or through electric infrared heaters. A supply of steam does not need to be provided thereby significantly reducing the utility costs associated with heater operation. The use of costly antimicrobial chemicals and expensive ionizing radiation equipment can also be avoided with the present invention.

The most preferred processing apparatus is in the form of an elongated tunnel-type heater comprising upper and lower opposed banks of infrared heaters, with a shiftable belt extending between the heater banks and operable to carry nuts to be processed. Additionally, at least one (and preferably a multiciplicity of) stations are provided along the length of the heater for deposition of water onto the nuts during passage through the tunnel-type heater device.

DETAILED DESCRIPTION OF THE PREFERRED EMBODIMENT

Figure 1:
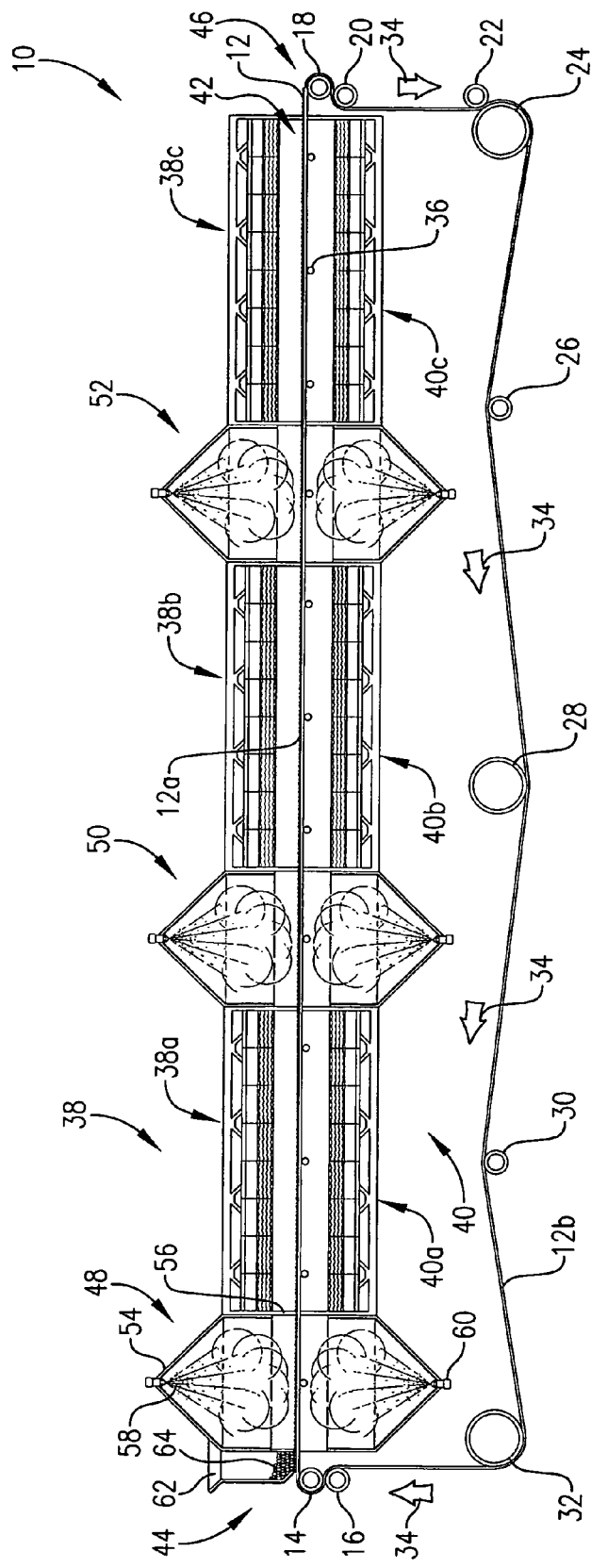
FIG. 1 is a schematic view of an infrared heater having a plurality of alternating heating and water application zones.

FIG. 1 schematically illustrates an infrared heater 10 useful in the invention. The heater 10 includes a continuous, shiftable, perforate belt 12 oriented to present an upper run 12a and a lower run 12b. The belt 12 is supported by nip rollers 14, 16, 18, 20 at respective ends of the upper run 12a, and also by lower idler rollers 22, 24, 26, 28, 30, 32. The nip roller sets 14, 16, 18, 20 are conventionally powered for moving the belt along the path indicated by arrows 34. As depicted, the upper run 12a of belt 12 is supported and maintained in a generally rectilinear fashion by means of transversely extending, axially spaced apart support rods 36.

The heater 10 includes an upper bank of infrared heaters 38 made up of axially spaced heater sections 38a, 38b, 38c. Also, a lower infrared heater bank 40 is provided, again comprising heater sections 40a, 40b, 40c. The heater banks 38, 40 are in direct opposed relationship so as to define an elongated passageway 42 extending along the length of the heater and defining an entry end 44 and an exit end 46. Infrared heaters 38, 40 can be flameless catalytic heaters such as those available from Catalytic Industrial Group, Independence, Kans. or electric heaters. The heaters preferably emit infrared radiation in a wavelength of about 2-7 microns. As illustrated, the upper run 12a of belt 12 extends along the entire length of passageway 42, approximately midway between the infrared heater banks 38, 40.

The overall heater 10 includes, in the illustrated embodiment, three water application stations 48, 50, 52. The station 48 is located adjacent passageway entry 44; the station 50 is between upper heater sections 38a, 38b and lower heater sections 40a, 40b; and station 52 is located between upper heater sections 38b, 38c and lower heater sections 40b, 40c. Each of the sections 48-52 is identical and includes a shroud or casing 54 having a central opening 56 therethrough. The upper and lower peaked ends of shroud 54 are equipped with downwardly and upwardly directed nozzles 58, 60 which are designed to provide a spray or mist of water onto the upper and lower surfaces of belt run 12a, respectively. The purpose of shroud 54 is to substantially contain the spray or mist of water applied to product passing through the respective stations 48-52.

Finally, it will be seen that the heater 10 has an inlet device 62 adjacent entry 44, for the purpose of depositing nuts 64 onto the upper surface of belt run 12a. Although not shown, the device 62 may be equipped with a rotary valve or other conventional expedient for depositing a relatively even layer of nuts onto run 12a during movement thereof.

In operation, nuts to be treated are deposited in device 62 and are in turn placed upon the upper surface of belt run 12a. As the belt 12 is moved, the deposited nuts pass in serial order through station 48, a first infrared heating zone defined by upper and lower heater sections 38a, 40a, station 50, a second infrared heating zone defined by upper and lower heater sections 38b, 40b, station 52, and finally through a terminal heating section defined by upper and lower heater sections 38c, 40c. Upper and lower heater sections 38, 40 are employed to ensure that substantially the entire surface of the nut is exposed to the infrared radiation and provide the greatest possible microorganism kill. The treated nuts fall under the influence of gravity from belt run 12a adjacent exit end 46, and are then conventionally collected on a cooling belt or bin (not shown). While it may be possible to utilize overhead heaters only, it will be necessary to turn the nuts over at some point during the process. This would require multiple passes though the heater with agitation of the nuts between passes to ensure that substantially all surfaces of the nut were exposed to the infrared radiation.

Figure 2:
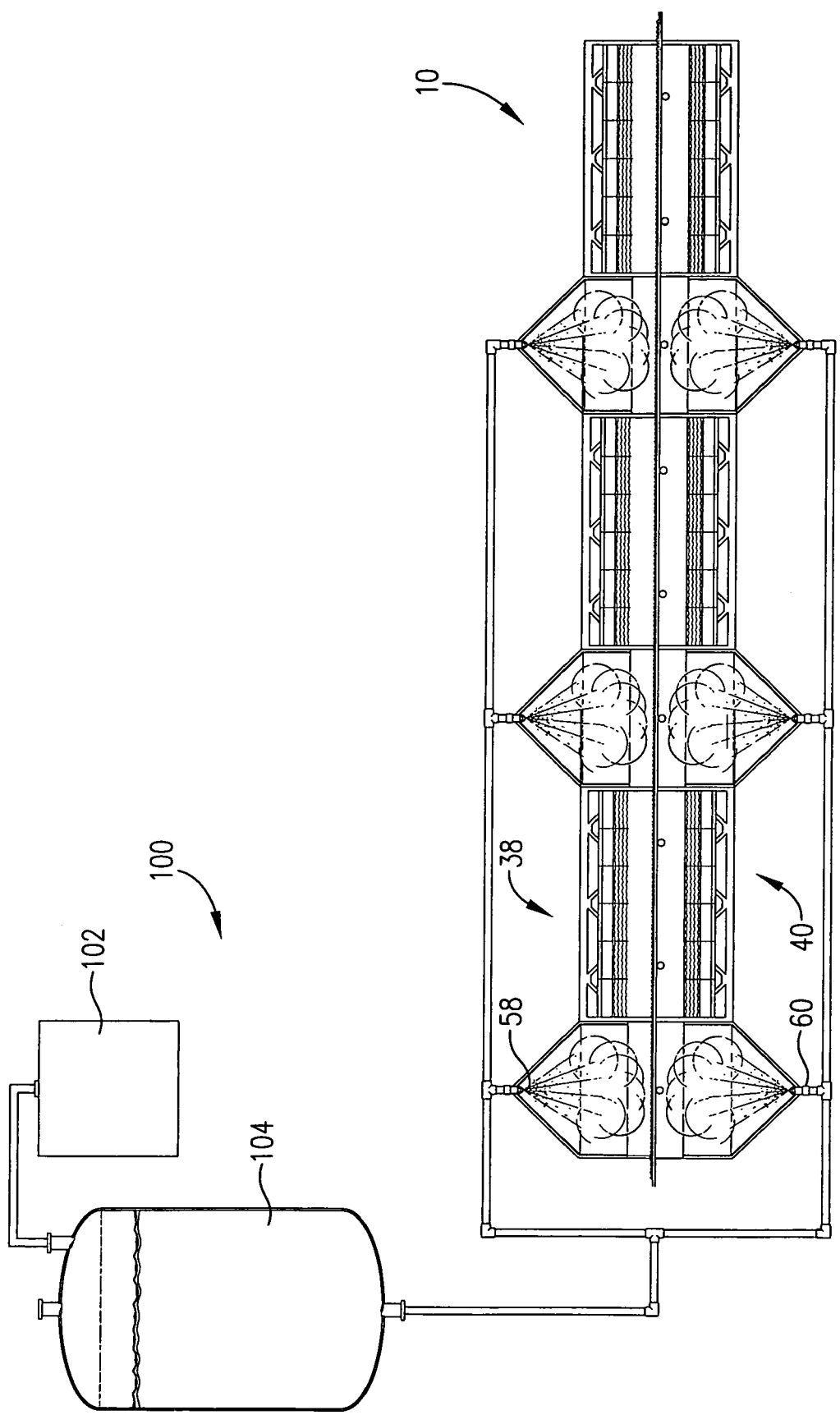
FIG. 2 is a schematic view of an infrared heating apparatus having a plurality of alternating heating and water application zones, with the water application zones being supplied by an EO water generator.

FIG. 2 depicts apparatus 10 from FIG. 1 (with some parts removed for ease of illustration) equipped with an EO water application system 100. System 100 includes an EO water generator 102 that is fluidly coupled to an EO water reservoir 104. Reservoir 104 may be omitted provided that generator 102 is capable of producing a sufficient supply of EO water on demand. Reservoir 104, however, facilitates continuous operation of apparatus 10 by ensuring the availability of sufficient quantities of EO water. The EO water is then delivered from reservoir 104 to nozzles 58, 60. As shown, the EO water is delivered by hydrostatic head pressure, however, it is certainly within the scope of the invention for delivery to be accomplished by a pump mechanism.

As noted above, many variations to apparatus 10 can be envisioned that are within the ability of those skilled in this art. For example, a single water application station may be employed followed by a single IR heating station, provided the residence time in each station was of sufficient duration to achieve the necessary reduction in microorganism levels. The water application station(s) and heating station(s) may be contained within the same housing or could be located in separate housings connected by a means for transporting the nuts therebetween. The embodiments of the present invention depicted in FIGS. 1 and 2 should not be taken as limiting the scope of the invention in any way and are only exemplary of equipment capable of carrying out the inventive process set forth herein.

The goal of nut processing in apparatus 10 is to reduce the level of potentially harmful microorganisms carried by the as-received nuts. It has been found that sequential moisturization of the nuts followed by infrared heating through a series of cycles will very materially reduce the microorganism levels. Moisturization has been found to activate the microorganisms thereby placing them in a state most susceptible to being killed. As nuts generally contain very low amounts of internal moisture, microorganism activation is achieved by wetting the outer surface of the nuts prior to infrared radiation exposure. Generally speaking, it is desirable to process nuts with at least three cycles of moisturization and infrared heating, although such is not essential. In addition, at each moisturization station, water should be added at a level of from about 0.05-0.2 g of water per gram of nuts to be treated, and more preferably at 0.05-0.1 g of water per gram of nuts.

The infrared heaters should be operated so as to elevate the temperature of the nuts sufficiently to kill a substantial fraction of microorganisms on the nuts. In general, the nuts should exit the heater at a temperature of at least about 140° F., and more preferably at at least about 170° F. In terms of upper and lower temperatures, the nuts should exit the heater at a temperature of from about 140-250° F. and more preferably at about 170-230° F. The total residence time of the nuts within heater 10 should be on the order of from about 60-600 seconds and more preferably of from about 200-600 seconds. The total residence time may be equally divided between the individual heating sections, but this is not a critical factor. An advantage to using EO water as a part of the treatment process is that the IR exposure time may be reduced to between about 20-100 seconds, more preferably between about 30-90 seconds, and most preferably between about 40-80 seconds.

The invention may be used for the treatment of virtually any variety of nut, although nuts selected from the group consisting of almonds, peanuts, Brazil nuts, cashews, hazelnuts, macadamias, pecans, pine nuts, pistachios, walnuts and mixtures thereof are preferred. The techniques of the invention are suitable for reducing or essentially eliminating potentially harmful microorganisms carried by the nuts, including without limitation *Salmonella enteritidis*, *Escherichia coli*, and *Staphylococcus aureus*.

EXAMPLES

The following examples set forth illustrative methods in accordance with the invention, describing techniques for control of microorganisms on nuts. It is to be understood, however, that these examples are provided by way of illustration only, and nothing therein should be taken as a limitation upon the overall scope of the invention.

Example 1

In this example, almond samples were inoculated with *Salmonella enteritidis* and treated by sequentially heating and water-misting the inoculated almonds. Thereafter, the degree of microorganism kill was recorded and compared with control samples.

In particular, *Salmonella enteritidis* PT30 obtained from the National Food Laboratory was used in this study. The microorganism was maintained in phenol red agar media supplemented with sucrose (10.0 g/L) and sodium thiosulfate (0.3 g/L). Ferric ammonium citrate (0.5 g/L) was used as the recovery medium in all experiments. Stomaching was done using peptone water and serial dilutions were also done using peptone water.

Cultures were prepared by inoculation into 35 mL of tryptic soy broth followed by incubation at 35° C. well into the stationary phase (18 hours). The 18-hour culture was then used to inoculate seven TSA plates (100×15 mm) to produce a bacterial lawn after incubation for 24 hours at 35° C. Approximately seven plates were needed for 400 g almond samples. A 4 mL aliquot of 0.1% peptone was used to loosen the bacterial lawn with a sterile spreader. All of the inocula from all plates were pooled and mixed thoroughly.

Three 400 g almond samples were weighed into individual sterile bags. The almonds in each bag were then inoculated with 25 mL of the above-described inoculum by pipetting the inoculum solution over the almonds in the bags. The bags were closed and shaken by hand for 60 seconds. Sterile aluminum foil was placed on trays and filter paper placed on top of the foil. The almonds from the respective bags were then poured onto the trays, and the trays were stored for 24 hours at 24±1° C. in order to dry the almonds. Thereupon, eight 100 g almond test samples and one 25 g almond control sample were transferred into sterile bags and shipped to the processing site under refrigerated conditions. A bacterial count was taken on the control sample as of the day of inoculation, the day of plating, and the day of treatment of the eight test samples.

The eight 100 g inoculated samples (having an initial temperature of from about 68-71° F.) were pulse-heated in a flameless catalytic gas-fired infrared heater from top and bottom which was pre-heated for about 30 minutes before processing of the samples. Each 100 g sample was initially mixed with approximately 5 g of water prior to the first pulse and then again prior to each succeeding pulse. The infrared heater was operated for dwell times as follows: 150 seconds/7 pulses; 135 seconds/6 pulses; 100 seconds/4 pulses; 85 seconds/5 pulses; 105 seconds/5 pulses; and 110 seconds/5 pulses. Upon heating through the total residence time, the processed nuts had a temperature of from about 200-250° F. The heated nuts were then cooled to about 100° F. using an industrial fan for approximately 2.5 minutes. The inoculated, heat treated almonds were then placed in sterile bags and chilled immediately in ice. The bags were then placed in a refrigerator for one hour and were shipped under refrigerated conditions for laboratory analysis. All temperatures were measured using a hand-held infrared thermometer prior to entering the heater and after exiting from the heater.

The following tables set forth the parameters of the infrared heating tests using the eight 100 g inoculated samples, as well as results for water activity and moisture, and final reduction in bacterial count.

Test Parameters:

TABLE 1.1

Test #1 Parameters

| Cycle Number | Temp of almonds entering the Oven (° F.) | Total residence time in oven (sec) | Temp of almonds exiting the Oven (° F.) | Time between cycles (sec) |
|---|---|---|---|---|
| 1 | 69 | 50 | 230 | 32 |
| 2 | 148 | 20 | 250 | 28 |
| 3 | 160 | 15 | 230 | 45 |
| 4 | 140 | 15 | 245 | 45 |
| 5 | 145 | 15 | 210 | 32 |
| 6 | 150 | 20 | 240 | 37 |
| 7 | 140 | 15 | 220 | n/a |

TABLE 1.2

Test #2 Parameters

| Cycle Number | Temp of almonds entering the Oven (° F.) | Total residence time in oven (sec) | Temp of almonds exiting the Oven (° F.) | Time between cycles (sec) |
|---|---|---|---|---|
| 1 | 68 | 50 | 220 | 21 |
| 2 | 150 | 20 | 250 | 28 |
| 3 | 168 | 15 | 200 | 33 |
| 4 | 140 | 15 | 230 | 34 |
| 5 | 140 | 15 | 200 | 45 |
| 6 | 145 | 20 | 220 | n/a |

TABLE 1.3

Test #3 Parameters

| Cycle Number | Temp of almonds entering the Oven (° F.) | Total residence time in oven (sec) | Temp of almonds exiting the Oven (° F.) | Time between cycles (sec) |
|---|---|---|---|---|
| 1 | 70 | 50 | 250 | 25 |
| 2 | 140 | 20 | 230 | 32 |
| 3 | 140 | 15 | 240 | 22 |
| 4 | 150 | 15 | 220 | 37 |
| 5 | 150 | 15 | 230 | 24 |
| 6 | 135 | 20 | 250 | 22 |
| 7 | 150 | 15 | 240 | n/a |

TABLE 1.4

Test #4 Parameters

| Cycle Number | Temp of almonds entering the Oven (° F.) | Total residence time in oven (sec) | Temp of almonds exiting the Oven (° F.) | Time between cycles (sec) |
|---|---|---|---|---|
| 1 | 69 | 50 | 240 | 13 |
| 2 | 170 | 20 | 260 | 17 |
| 3 | 170 | 15 | 230 | 18 |
| 4 | 170 | 15 | 245 | n/a |

TABLE 1.5

Test #5 Parameters

| Cycle Number | Temp of almonds entering the Oven (° F.) | Total residence time in oven (sec) | Temp of almonds exiting the Oven (° F.) | Time between cycles (sec) |
|---|---|---|---|---|
| 1 | 69 | 50 | 250 | 10 |
| 2 | 168 | 20 | 230 | 14 |
| 3 | 170 | 15 | 210 | 20 |
| 4 | 150 | 15 | 250 | n/a |

TABLE 1.6

Test #6 Parameters

| Cycle Number | Temp of almonds entering the Oven (° F.) | Total residence time in oven (sec) | Temp of almonds exiting the Oven (° F.) | Time between cycles (sec) |
|---|---|---|---|---|
| 1 | 71 | 40 | 190 | 17 |
| 2 | 140 | 15 | 190 | 18 |
| 3 | 150 | 10 | 190 | 19 |
| 4 | 140 | 10 | 220 | 18 |
| 5 | 135 | 10 | 200 | n/a |

TABLE 1.7

Test #7 Parameters

| Cycle Number | Temp of almonds entering the Oven (° F.) | Total residence time in oven (sec) | Temp of almonds exiting the Oven (° F.) | Time between cycles (sec) |
|---|---|---|---|---|
| 1 | 70 | 45 | 230 | 150 |
| 2 | 150 | 15 | 220 | 14 |
| 3 | 140 | 15 | 230 | 19 |
| 4 | 150 | 15 | 190 | 21 |
| 5 | 140 | 15 | 220 | n/a |

TABLE 1.8

Test #8 Parameters

| Cycle Number | Temp of almonds entering the Oven (° F.) | Total residence time in oven (sec) | Temp of almonds exiting the Oven (° F.) | Time between cycles (sec) |
|---|---|---|---|---|
| 1 | 72 | 45 | 220 | 23 |
| 2 | 155 | 15 | 220 | 19 |
| 3 | 170 | 15 | 230 | 20 |
| 4 | 140 | 20 | 220 | 22 |
| 5 | 150 | 15 | 210 | n/a |

The following Tables 2 and 3 set forth the bacterial count reduction in the treated almonds versus the control, and also the water activity and moisture results.

TABLE 2

Salmonella enteritidies PT30 Results

| Sample Description | CFU/g | Log Values* | Log Reduction (compared to Control) |
|---|---|---|---|
| Inoculated Control (Day 0) | 31310000000 | 8.5 | n/a |
| Inoculated Control (day of experiment) | 260000000 | 8.4 | n/a |
| Processed Samples (includes total exposure time to infrared heating) | | | |
| Test #1 (150 seconds) | 15 | 1.2 | 7.2 |
| Test #2 (135 seconds) | 10150 | 1.0 | 4.4 |
| Test #3 (150 seconds) | <10 | <1.0 | >7.4 |
| Test #4 (100 seconds) | 13150 | 4.1 | 4.3 |
| Test #5 (100 seconds) | 60 | 1.8 | 6.6 |
| Test #6 (85 seconds) | 11600 | 4.1 | 4.3 |
| Test #7 (105 seconds) | 340000 | 5.5 | 2.9 |
| Test #8 (110 seconds) | 120 | 2.1 | 6.3 |

*Log average CFU/g. Values were obtained by calculating the average CFU/g for each set and then taking the log of this number.

TABLE 3

Water Activity and Moisture Results

| Sample Description | Water Activity | Log Reduction (compared to Control) |
|---|---|---|
| Uninoculated Control | 0.505 | 5.23 |
| Inoculated Control (Day 0) | 0.531 | n/a |
| Inoculated Control (day of experiment) | n/a | n/a |
| Processed Samples (includes total exposure time to infrared heating) | | |
| Test #1 (150 seconds) | 0.549 | n/a |
| Test #2 (135 seconds) | 0.657 | n/a |
| Test #3 (150 seconds) | 0.590 | n/a |
| Test #4 (100 seconds) | 0.583 | n/a |
| Test #5 (100 seconds) | 0.588 | n/a |
| Test #6 (85 seconds) | 0.642 | n/a |
| Test #7 (105 seconds) | 0.603 | n/a |
| Test #8 (110 seconds) | 0.615 | n/a |

Example 2

In this example, the effectiveness of treating almonds inoculated with *Salmonella Enteritidis* phage type 30 (SEPT30) with the acid portion of EO water, infrared radiation exposure, and a combination thereof was studied.

Preparation of Inoculum

Fresh cultures of SEPT30 were revived from a frozen stock culture maintained at −80° C. by sub-culturing onto tryptic soy agar (TSA) from Becton BD Diagnostic Systems, Sparks, Md. and incubating for 24 hours at 35° C. A single isolated colony was transferred into tryptic soy broth (TSB) and incubated for 24±2 hours at 35±2° C. A subsequent loop transfer and overnight incubation at 35±2° C. was performed. The overnight culture was used to inoculate 150 mm×15 mm TSA plates to produce a bacterial lawn after incubation for 24±2 hours at 35±2° C. Three plates were prepared per 400 g batch of almonds. Following incubation, approximately 8-9 ml of 0.1% peptone was added to each large plate. The bacterial lawn was loosened with a sterile spreader and a sterile pipette was used to collect the loosened cell suspension (approximately 25 ml). Prior to inoculating the almonds, the appropriate number of 25 ml suspensions were pooled and thoroughly mixed for a minimum of one minute.

Inoculation of Raw Almonds

Raw almonds were inoculated by adding 400 g of almonds into a sterile plastic polyethylene bag with 25 ml of the pooled *Salmonella* inoculum. The bag was then closed and shaken by hand through inversion for 60 seconds. Almonds were poured out of the bag and spread onto two sheets of 46×57 cm filter paper (Fisherbrand Qualitative P8, Fisher Scientific, Pittsburgh, Pa.), and folded in half. The filter paper was placed on a metal drying rack and placed inside a large plastic tub. The almonds were dried for 24±2 hours at 24±2° C. with the lid ajar. Inoculated dried almonds were separated into 100 g sub-samples for use in the trials below.

Treatment of Almonds

Inoculated almonds were treated using an electrolyzed oxidized (EO) water sanitizer and dried for 40 seconds (20 seconds exposure to heat followed by shaking followed by an additional 20 seconds exposure to heat) using a gas catalytic infrared heater supplied by Catalytic Industrial Group. A total of three trials were performed using different lengths of exposure to the EO water (3.5, 4, and 4.5 minutes). Lengths of exposure were randomized to reduce the effect of possible experimental variables, such as oven temperature or ambient almond temperature. After treatment, almonds were cooled using an air dryer. Temperature measurements were taken before treatment, after heating and after cooling using an infrared thermometer. After cooling, the almonds were aseptically transferred to sterile sample bags for transport to the lab. Three replicates of each trial were performed and are designated T1-T9. The temperature data observed during these trials are shown in Table 4.

TABLE 4

| Trial | Pre-Treatment (° F.) | Post-Treatment (° F.) | Post-Drying (° F.) | Post-Cooling (° F.) |
|---|---|---|---|---|
| 3.5 min EO, IR Dry (T1) | 69.3 | 65.6 | 188.8 | 88.3 |
| 3.5 min EO, IR Dry (T2) | 69.6 | 67 | 172.4 | 89.2 |
| 3.5 min EO, IR Dry (T3) | 72.4 | 68 | 155.7 | 87.5 |
| 4 min EO, IR Dry (T4) | 69.7 | 67.2 | 177.2 | 86 |
| 4 min EO, IR Dry (T5) | 71.1 | 67.8 | 163.7 | 88.1 |
| 4 min EO, IR Dry (T6) | 72.5 | 67.2 | 188.4 | 87.9 |
| 4.5 min EO, IR Dry (T7) | 69.1 | 63.5 | 174 | 85.3 |
| 4.5 min EO, IR Dry (T8) | 69.9 | 66.6 | 184.4 | 89.4 |
| 4.5 min EO, IR Dry (T9) | 71.5 | 67.5 | 163.7 | 89.9 |

Five supplemental trials were performed to assess the separate performance of each portion of the procedure. In trials ST10-ST12, a 100 g sample of almonds was exposed to EO water for four minutes and then air dried to determine the effects of EO water exposure. Another 100 g sample of almonds was pre-treated with sterile water and then dried using the IR oven as above to determine the effects of IR exposure alone (trials ST13-ST15). A 100 g sample of almonds was pre-treated with alkaline EO water and then dried using the IR oven as above to determine the effects of alkaline EO water exposure as opposed to acid EO water exposure (trials ST16 and ST17). A fourth sample of almonds was exposed to alkaline EO water followed by acid EO water and then air dried to determine if any additive effects of the combination could be observed (trials ST18 and ST19). Finally, a sample of almonds was exposed to EO water and dried in a conventional oven to determine the effects of heating without IR exposure (trials ST20 and ST21). Samples from each trial were cooled and packaged as described above for transport to the lab. The temperature data observed during these supplemental trials is shown in Table 5.

TABLE 5

| Trial | Pre-Treatment (° F.) | Post-Treatment (° F.) | Post-Drying (° F.) | Post-Cooling (° F.) |
|---|---|---|---|---|
| 4 min EO, Air Dry (ST10) | 71.9 | 64.1 | n/a | 71.8 |
| 4 min EO, Air Dry (ST11) | 72.9 | 64 | n/a[2] | 73 |
| 4 min EO, Air Dry (ST12) | 72.9 | 67 | n/a | 71.9 |
| 4 min DI, IR Dry (ST13) | 72.4 | 65.6 | 171.3 | 86.3 |
| 4 min DI, IR Dry (ST14) | 73.4 | 68 | 188 | 87.5 |
| 4 min DI, IR Dry (ST15) | 73.3 | 67.8 | 187.7 | 82.2 |
| 4 min Alkaline EO, IR Dry (ST16) | 73.1 | 67.2 | 171.7 | 86.4 |
| 4 min Alkaline EO, IR Dry (ST17) | 73 | 67 | 165.2 | 88.5 |
| 4 min Alkaline + Acid EO, Air Dry (ST18) | 73.3 | 65 | n/a | 73.3 |
| 4 min Alkaline + Acid EO, Air Dry (ST19) | 72.2 | 63.8 | n/a | 76.1 |
| 4 min EO, Conventional Dry (ST20) | 74.8 | 69.1 | n/a | 90.1 |
| 4 min EO, Conventional Dry (ST21) | 74 | 67.9 | n/a | 88.7 |

In addition to the trials above, inoculated, non-treated samples were transported to the lab to determine actual pre-treatment inoculum levels.

Enumeration of *Salmonella*

Almonds to be assessed for pathogen were added to an equal volume (100 g to 100 ml) of Butterfield's phosphate buffer (BPB). Samples were shaken vigorously 50 times in a 30 cm arc and after standing for five minutes were shaken and additional five times before serial dilution and plating. Samples were plated at appropriate dilutions in duplicate using a spiral plater (Spiral Biotech Autoplate 4000) onto TSA and XLT4 Agar. Plates were counted after incubation at 35±2° C. for 24±2 hours on an automated counting system (Advanced Instruments 510 using Q Count™ software, version 1.5). Counts obtained from treated samples were compared with counts from non-treated samples to determine the reduction in SEPT30.

Plate count data for the untreated trial is shown in Table 6, including replicate, raw count (in CFU/g) for each media used, average count, and the $\log_{10}$ of the average. Each almond trial is displayed in Table 7. Log reduction of *Salmonella* is summarized by exposure time in Table 8.

TABLE 6

| Sample | XLT4-1 | XLT4-2 | Average[1] | $\log_{10}$ | TSA-1 | TSA-2 | Average[1] | $\log_{10}$ |
|---|---|---|---|---|---|---|---|---|
| Untreated-1 | 22,400,000 | 31,500,000 | 26,950,000 | 7.43 | 34,200,000 | 69,000,000 | 51,600,000 | 7.71 |
| Untreated-2 | 46,800,000 | 36,800,000 | 41,800,000 | 7.62 | 51,500,000 | 32,200,000 | 41,850,000 | 7.62 |
| Untreated-3 | 14,600,000 | 19,200,000 | 16,900,000 | 7.23 | 29,200,000 | 98,000,000 | 63,600,000 | 7.80 |
| Overall Average | | | 28,550,000 | 7.46 | | | 52,350,000 | 7.72 |

[1]Reported as CFU/g

TABLE 7

| Trail | EO Exposure | XLT4-1 | XLT4-2 | Average[1] | $\log_{10}$ | Reduction | TSA-1 | TSA-2 | Average[1] | $\log_{10}$ | Reduction |
|---|---|---|---|---|---|---|---|---|---|---|---|
| T1 | 3.5 min | 119 | 715 | 417 | 2.62 | 4.84 | 161 | 663 | 412 | 2.61 | 5.10 |
| T2 | 3.5 min | 930 | 1,520 | 1,225 | 3.09 | 4.37 | 964 | 238 | 601 | 2.78 | 4.94 |
| T3 | 3.5 min | 908 | 411 | 660 | 2.82 | 4.64 | 628 | 1,130 | 879 | 2.94 | 4.77 |
| T4 | 4 min | 101 | 114 | 108 | 2.03 | 5.42 | 173 | 709 | 441 | 2.64 | 5.07 |
| T5 | 4 min | 119 | 115 | 117 | 2.07 | 5.39 | 141 | 631 | 386 | 2.59 | 5.13 |
| T6 | 4 min | 122 | 506 | 314 | 2.50 | 4.96 | 140 | 607 | 374 | 2.57 | 5.15 |
| T7 | 4.5 min | 163 | 83 | 123 | 2.09 | 5.37 | 137 | 79 | 108 | 2.03 | 5.69 |
| T8 | 4.5 min | 29 | 136 | 83 | 1.92 | 5.54 | 72 | 76 | 74 | 1.87 | 5.85 |
| T9 | 4.5 min | 120 | 74 | 97 | 1.99 | 5.47 | 211 | 63 | 137 | 2.14 | 5.58 |
| ST10 | 4 min | 4,770,000 | 818,000 | 2,794,000 | 6.45 | 1.01 | 5,640,000 | 6,060,000 | 5,850,000 | 6.77 | 0.95 |
| ST11 | 4 min | 3,070,000 | 818,000 | 1,944,000 | 6.29 | 1.17 | 1,160,000 | 889,000 | 1,024,500 | 6.01 | 1.71 |
| ST12 | 4 min | 2,410,000 | 3,470,000 | 2,940,000 | 6.47 | 0.99 | 5,850,000 | 2,040,000 | 3,945,000 | 6.60 | 1.12 |
| ST13 | 4 min | 157,000 | 78,800 | 117,900 | 5.07 | 2.38 | 419,000 | 92,400 | 255,700 | 5.41 | 2.31 |
| ST14 | 4 min | 241,000 | 61,400 | 151,200 | 5.18 | 2.28 | 459,000 | 70,400 | 264,700 | 5.42 | 2.30 |
| ST15 | 4 min | 336,000 | 52,300 | 194,150 | 5.29 | 2.17 | 358,000 | 89,400 | 223,700 | 5.35 | 2.37 |
| ST16 | 4 min | 79,200 | 17,900 | 48,550 | 4.69 | 2.77 | 226,000 | 38,500 | 132,250 | 5.12 | 2.60 |
| ST17 | 4 min | 25,100 | 22,500 | 23,800 | 4.38 | 3.08 | 59,800 | 66,400 | 63,100 | 4.80 | 2.92 |
| ST18 | 4 min | 580,000 | 358,000 | 469,000 | 5.67 | 1.78 | 666,000 | 511,000 | 588,500 | 5.77 | 1.95 |
| ST19 | 4 min | 1,070,000 | 204,000 | 637,000 | 5.80 | 1.65 | 2,880,000 | 603,000 | 1,741,500 | 6.24 | 1.48 |
| ST20 | 4 min | 217,000 | 102,000 | 159,500 | 5.20 | 2.25 | 157,000 | 828,000 | 492,500 | 5.69 | 2.03 |
| ST21 | 4 min | 149,000 | 102,000 | 125,500 | 5.10 | 2.36 | 849,000 | 343,000 | 596,000 | 5.77 | 1.94 |

[1]Reported as CFU/g

TABLE 8

| Standard Tests | XLT4 Reduction | | | | TSA Reduction | | | TSA | Overall |
|---|---|---|---|---|---|---|---|---|---|
| | Replicate 1 | Replicate 2 | Replicate 3 | XLT4 Average | Replicate 1 | Replicate 2 | Replicate 3 | Average | Average |
| Exposure Averages: | | | | | | | | | |
| 3.5 min | 4.84 | 4.37 | 4.64 | 4.61 | 5.10 | 4.94 | 4.77 | 4.94 | 4.78 |
| 4 min | 5.42 | 5.39 | 4.96 | 5.26 | 5.07 | 5.13 | 5.15 | 5.12 | 5.19 |
| 4.5 min | 5.37 | 5.54 | 5.47 | 5.46 | 5.69 | 5.85 | 5.58 | 5.71 | 5.58 |
| Supplemental Tests: | | | | | | | | | |
| EO Water plus Air Dry | 1.01 | 1.17 | 0.99 | 1.05 | 0.95 | 1.71 | 1.12 | 1.26 | 1.16 |
| Sterile Water plus IR | 2.38 | 2.28 | 2.17 | 2.28 | 2.31 | 2.30 | 2.37 | 2.33 | 2.30 |
| EO Alkaline plus IR | 2.77 | 3.08 | | 2.92 | 2.60 | 2.92 | | 2.76 | 2.84 |
| EO Alkaline + EO Acid | 1.78 | 1.65 | | 1.72 | 1.95 | 1.48 | | 1.71 | 1.72 |
| EO Water plus Conv. Oven | 2.25 | 2.36 | | 2.30 | 2.03 | 1.94 | | 1.99 | 2.14 |

The data for the standard test shows a strong correlation between EO water exposure time and log reduction of *Salmonella* in the almonds. The almonds treated with EO water for the longer exposure times demonstrated the highest overall reduction in *Salmonella* levels. For the supplemental tests, the greatest average reduction in *Salmonella* was achieved with the EO alkaline water followed by IR drying. However, this reduction was still more than two orders of magnitude less than that experienced in the standard tests.

There was no noticeable increase in undesirable physical characteristics of the almonds (such as blistering, bleaching, etc.) after the EO water treatment or IR heating. The moisture level of the almonds before treatment was 3.21%. After treatment, the moisture level was measured to be 4.03%, a gain of 0.82%.

I claim:

1. A method of treating nuts to reduce the level of microorganisms carried thereby, comprising the steps of applying electrolyzed-oxidizing (EO) water to the surface of the nuts and thereafter subjecting the moistened nuts to infrared radiation sufficient to reduce said microorganism level.

2. The method of claim 1, including the step of subjecting the nuts to sufficient infrared radiation to elevate the temperature of the nuts to a level of at least about 140° F.

3. The method of claim 1, including the step of adding EO water to said nuts at a level of about 0.15-0.2 g of water per grain of nuts.

4. The method of claim 1, including the step of reducing the level of at least one microorganism carried by said nuts by a factor of at least about 99.99% as compared with the microorganism count of said nuts prior to processing thereof.

5. The method of claim 1, said microorganism comprising *Salmonella enteritidis*.

6. The method of claim 1, said nuts selected from the group consisting of almonds, peanuts, Brazil nuts, cashews, hazelnuts, macadamias, pecans, pine nuts, pistachios, walnuts and mixtures thereof.

7. The method of claim 1, said EO water having a pH of less than about 6.

8. The method of claim 1, said EO water having an oxidation-reduction potential of at least +650 mV.

9. The method of claim 1, said EO water comprising an amount of hypochlorous acid.

10. The method of claim 1, the step of subjecting the nuts to infrared radiation commencing no earlier than at least 2 minutes after the beginning of said water application step.

11. The method of claim 1, including the step of subjecting said nuts to said infrared radiation for a period of from about 20-100 seconds.

12. The method of claim 1, including the steps of sequentially applying water to said nuts and subjecting the nuts to infrared radiation through a plurality of cycles.

13. A method of treating particulate material to reduce the level of microorganisms carried thereby, comprising the steps of applying electrolyzed-oxidizing (EO) water to the surface of the particulate material and thereafter subjecting the moistened material to infrared radiation sufficient to reduce said microorganism level.

14. A method of treating nuts to reduce the level of microorganisms carried thereby, comprising the steps of applying water having a pH of less than about 6 to the surface of the nuts and thereafter subjecting the moistened nuts to infrared radiation sufficient to reduce said microorganism level.

15. A method of treating nuts to reduce the level of microorganisms carried thereby, comprising the steps of applying water having an oxidation-reduction potential of at least +650 mV to the surface of the moistened nuts and thereafter subjecting the nuts to infrared radiation sufficient to reduce said microorganism level.

* * * * *